No. 763,754. PATENTED JUNE 28, 1904.
C. F. HILKIER.
THERMOSTATIC DEVICE.
APPLICATION FILED JAN. 22, 1904.
NO MODEL.
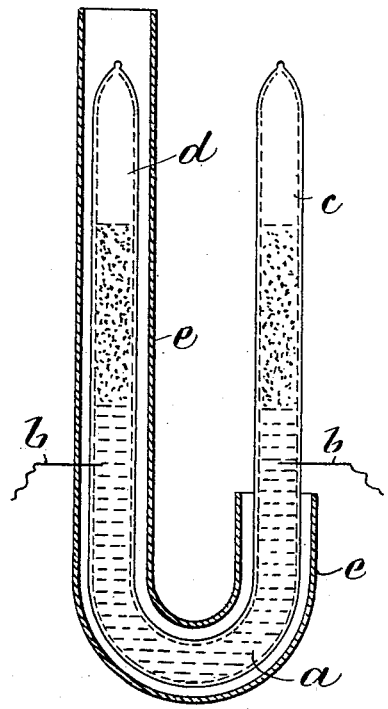

UNITED STATES PATENT OFFICE.

CHRISTIAN FREDERIK HILKIER, OF COPENHAGEN, DENMARK.

THERMOSTATIC DEVICE.

SPECIFICATION forming part of Letters Patent No. 763,754, dated June 28, 1904.

Application filed January 22, 1904. Serial No. 190,136. (No model.)

*To all whom it may concern:*

Be it known that I, CHRISTIAN FREDERIK HILKIER, cand. phil., of 30 St. Hans Torv, Copenhagen, Denmark, have invented certain new and useful Improvements in or Relating to Thermostatic Devices Particularly Adapted for Giving an Alarm in Case of Fire or of a Sudden Increase in Temperature, of which the following is a true description.

This invention relates to thermometers for indicating sudden increases in temperature, such increase actuating an alarm device.

A thermometer according to this invention is illustrated by way of example in the accompanying drawing, in which it is shown in vertical section.

A U-shaped tube $a$, preferably made of glass, contains as much mercury as is necessary to surround the platinum wires $b$, which are fused into the tube. In this way the wires are electrically connected, so that a weak current can pass to a sensitive relay. This relay is constructed in such a manner that when the current is cut off its armature operates an alarm or closes an alarm-circuit. The branches $c$ and $d$ of the tube are sealed at the top. Both branches contain above the mercury some suitable volatile liquid which has a determined boiling-point. The branch $c$ or the liquid contained therein above the mercury could be made, if desired, of dark color, so that it may absorb as many heat-rays as possible. The branch $d$ is surrounded by a sleeve $e$ or insulated from the outside air or radiant heat in some suitable way. When the temperature rises suddenly, the liquid in the branch $c$ will quickly begin to boil, or even if it does not actually boil there will be a generation of gas or vapors. Pressure on the mercury in that branch will therefore take place, so that the mercury in it will sink below the platinum wires, the current thus being broken. The relay will thereupon release its armature, and the alarm device will be operated or the alarm-circuit closed. The pressure on both columns of the liquid being very small, which can be effected by exhausting from the branches of the tube before sealing them all or nearly all the air, the counter-pressure in the branch $d$ will be thus very weak when the liquid in $c$ boils, and the liquid in $d$, owing to its insulation, will not evaporate or at least not so quickly as the liquid in the branch $c$. Should the temperature rise gradually, both the branches of the tube will be gradually heated to approximately the same extent. The thermometer will thus remain inoperative in case of gradual increase and will act only in case of a sudden increase of temperature.

It will be obvious that the apparatus described has also the advantage that it regulates itself, as any leakage in any of the branches of the tube will result in a part of the mercury being forced from it into the other branch, and as the platinum wires are arranged so that they dip into the mercury only when it is approximately on the same level in both branches the leakage will be notified by the apparatus itself.

Having now particularly described and ascertained the nature of my said invention and in what manner the same is to be performed, I declare that what I claim is—

1. A thermometer for indicating a sudden increase of temperature, characterized by a U-shaped tube sealed at both ends, the branches of the said tube being partially filled with mercury above which is placed some volatile liquid, one branch being insulated from radiant heat, while the other is adapted to be acted upon directly by such heat, substantially as described.

2. A construction of thermometer for indicating a sudden increase of temperature, characterized by the branches of a U-shaped tube containing mercury, said mercury being adapted to close an electric circuit through two platinum wires arranged in the tube branches, the arms of said tube being sealed at the top, a partial vacuum or space filled with rarefied air being situated in each branch above a liquid floating in its turn on the mercury one tube branch or the liquid contained in it being dark colored, while the other branch is surrounded with a heat-insulating sleeve or insulated in some other suitable manner so that sudden changes of temperature affect the upper liquid in the non-insulated branch only substantially as described.

3. A thermometer comprising a sealed tube, a body of mercury in said tube, bodies of volatile liquid in the tube at each end of the mercury, electrical connections adapted to be connected by said mercury, and an insulating-covering surrounding a portion of the tube occupied by one of the bodies of volatile liquid.

4. A thermometer comprising a sealed tube, a central body of mercury therein, bodies of volatile liquid at each end of said body of mercury, electrical connections projecting into the body of mercury near each end thereof in combination with an insulating-sleeve surrounding one end of the said tube.

In witness whereof I have hereunto set my hand in presence of two witnesses.

CHRISTIAN FREDERIK HILKIER.

Witnesses:
VIGGO C. EBERTH,
MAGNUS JENSEN.